March 22, 1938.　　　F. E. RUNGE　　　2,111,741
FILM GATE
Filed Dec. 31, 1936
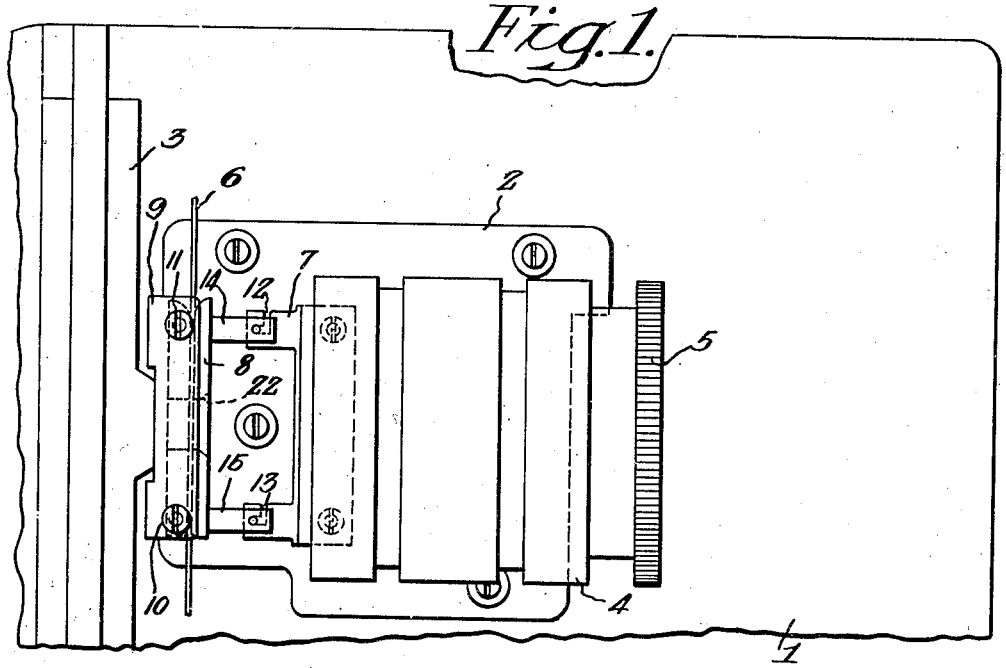
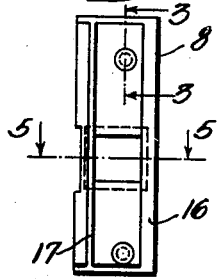
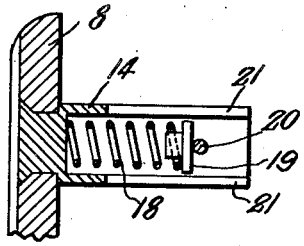
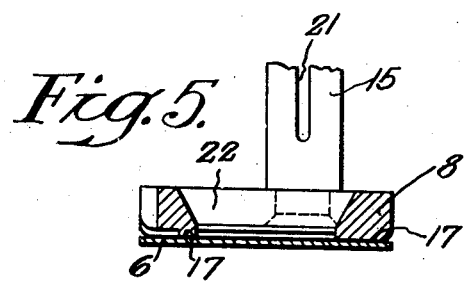
Inventor
Frank E. Runge
By
Attorney Patented Mar. 22, 1938

2,111,741

UNITED STATES PATENT OFFICE 2,111,741

FILM GATE

Frank E. Runge, Oaklyn, N. J., assignor to Radio Corporation of America, a corporation of Delaware Application December 31, 1936, Serial No. 118,518

1 Claim. (Cl. 88—17)

This invention relates to a new and useful improvement in film gates, and more particularly to the type of film gate used at the picture aperture of sound picture projectors.

In projectors using film having a sound record thereon, the sound record is ordinarily located adjacent to one edge of the film, and it is necessary to prevent damage to the record as it passes through the motion picture machine, in order to prevent the production of undesirable noises in the sound reproducer.

In 16 mm. projectors it is customary to have sprocket holes at one edge of the film only, and to have the sound track located in the area corresponding to the usual area of sprocket holes in silent picture film, at the opposite edge of the film.

In using this type of film, it is sometimes difficult to maintain the film perfectly flat at the picture gate, as the available contact area adjacent the sound track is quite small. The present invention pertains more particularly to a gate for accomplishing this purpose.

In a film gate constructed in accordance with my invention the pressure shoe is provided with film contacting portions of unequal surface areas at the two sides of the film. Springs are provided to hold the pressure shoe in contact with the film, and these springs are so located in relation to the film contacting surfaces as to give a uniform pressure per unit area on each of the surfaces. These same springs also serve to maintain the pressure shoe in place on the gate and are enclosed within tubular members which serve as guides for the pressure shoe in its movement and also serve to latch the pressure shoe in operative position.

One object of the invention is to provide a film gate which is readily removable for cleaning.

Another object of the invention is to provide a film gate through which film may be readily threaded.

Another object of the invention is to provide a film gate which will maintain the film flat at the picture projection point.

Another object of the invention is to provide a film gate which will have uniform wear at both edges of the pressure shoe, thereby greatly lengthening the useful life of the shoe.

Other and incidental objects of the invention will be apparent to those skilled in the art upon a reading of the following specification and an inspection of the accompanying drawing, in which:

Figure 1 is a side view of my improved film gate;

Fig. 2 is a view of the pressure shoe, looking from the side toward the film;

Fig. 3 is a vertical section through the pressure shoe on the line 3—3 of Fig. 2;

Fig. 4 is an elevation from the right hand side of Fig. 3; and

Fig. 5 is a section on the line 5—5 of Fig. 2.

Referring now to the drawing: The projector is provided with the usual center plate or housing 1, upon which are mounted a base 2 for the lens and film gate assembly, and an appropriate plate 3 through which light passes to the picture aperture. The base 2 carries a lens mounting barrel 4, in which a projection lens 5 is fitted in proper focal relation to the film 6.

On the rear of the barrel 4 is mounted a bracket 7 which supports the pressure shoe 8 of the film gate. If so desired the barrel 4 and the bracket 7 may be made movable as a unit in any of the usual ways in which one element of a film gate may be moved, as, for example, the unit may be hinged at the bottom to swing outwardly, it may be mounted on a parallel-link motion, or it may be mounted on one or more slides permitting it to slide longitudinally. This, however, is not essential, as the gate portion 8 may be moved in relation to the bracket 7 a sufficient distance to permit threading of the film.

The stationary portion 9 of the film gate is secured to the base 2 by means of screws 10 and 11, so that it may be readily replaced in case of excessive wear. This stationary member 9 may be either smooth on its film contacting face, or it may be appropriately relieved beneath the sound track and picture portions in the same manner as the pressure shoe 8, as shown in Fig. 2.

The bracket 7 is provided with two extending legs having L-shaped slots 12 and 13 which cooperate with the extending tubular members 14 and 15 of the pressure shoe 8 which is relieved beneath the sound track and picture portions, so as to provide a face 16 which cooperates with the film at the sprocket hole, and a second narrower face 17 which coacts with the face of the film between the pictures and the sound track.

It will be apparent that if pressure were uniformly applied to the pressure shoe, the pressure on the portion 17 would be much greater per unit area than on the portion 16, and this narrower portion 17 would therefore wear much more rapidly. Furthermore, either the pressure on the face 17 would be so great as to damage the film, or the pressure on the portion 16 would be inadequate to maintain the sprocket hole edge of the film flat. In order to avoid this difficulty, I locate the tubular members 14 and 15 on the line indicated at 3—3 in Fig. 2, which is so located in relation to the faces 16 and 17 that the pressure per unit area on these two faces is the same. This causes the faces of the pressure shoe to wear uniformly, and prevents damage to the film.

As shown in Fig. 3, the tubular members 14 and 15 are each provided with a compression spring 18 which coacts with a follower 19, movable within the tube, and which is stopped by a pin 20. The top and bottom of the members 14 and 15 are each provided with an appropriate slot 21 which may pass over the flat ends of the bracket 7.

In placing the pressure shoe 8 in operative position, the followers 19 are placed against the legs of the bracket 7, and the shoe is then pressed toward the lens 5, compressing the springs until the pins 20 drop into the slots 12 and 13. When the gate is released, the spring 18 moves the pressure shoe 8 toward the fixed member 9, causing the pins 20 to move into the bottom portions of the L-shaped slots, and thereby preventing vertical displacement of the pressure shoe 8, while at the same time permitting the pressure shoe to move horizontally in accordance with any irregularity in the film, such as splices or the like.

As shown in Fig. 1, and in greater detail in Fig. 5, the pressure shoe 8 is provided with an appropriate picture aperture 22, through which light transmitted by the film 6 may pass to the objective 5.

It will be apparent from the foregoing that I have provided a readily removable film gate in which the pressure shoe may be readily removed for cleaning or repair, and which provides a uniform pressure per unit area on all portions of the film in contact with the shoe.

Having now described my invention, I claim:

A pressure shoe for a film gate including a tubular spring retaining member, a compression spring therein, a retaining plunger in cooperative relation with said spring, and a pin extending across said tubular member, the said tubular member being slotted whereby the said member, the said stop, and the said plunger may coact with a correspondingly slotted bracket for removably retaining the said pressure shoe in operative position.

FRANK E. RUNGE.